United States Patent
Stamps

[19]

[11] Patent Number: 6,050,225

[45] Date of Patent: Apr. 18, 2000

[54] RADIO CONTROLLED RELEASE APPARATUS FOR ANIMAL DATA ACQUISITION DEVICES

[76] Inventor: James Frederick Stamps, 5252 Norma Way, Livermore, Alameda County, Calif. 94550

[21] Appl. No.: 08/620,097

[22] Filed: Mar. 21, 1996

[51] Int. Cl.⁷ .................................................. A62B 35/00
[52] U.S. Cl. ......................... 119/859; 119/908; 119/215; 119/200; 342/51
[58] Field of Search ..................................... 119/859, 908, 119/215, 200; 342/51, 44, 42; 340/825.69, 825.72

[56] References Cited

U.S. PATENT DOCUMENTS

| | | | |
|---|---|---|---|
| 1,349,665 | 8/1920 | Duncombe | 119/859 |
| 4,652,261 | 3/1987 | Mech et al. | 604/130 |
| 4,762,088 | 8/1988 | Chapman et al. | 119/106 |
| 4,876,674 | 10/1989 | Parmely et al. | 119/859 |
| 5,448,643 | 9/1995 | Parker | 380/59 |
| 5,504,485 | 4/1996 | Landt et al. | 342/42 |
| 5,508,705 | 4/1996 | Spiess | 342/44 |
| 5,857,434 | 1/1999 | Anderson | 119/859 |

*Primary Examiner*—Peter M. Poon
*Assistant Examiner*—Judith A. Nelson
*Attorney, Agent, or Firm*—Timothy P. Evans

[57] ABSTRACT

A novel apparatus for reliably and selectively releasing a data acquisition package from an animal for recovery. The data package comprises two parts: 1) an animal data acquisition device and 2) a co-located release apparatus. One embodiment, which is useful for land animals, the release apparatus includes two major components: 1) an electronics package, comprising a receiver; a decoder comparator, having at plurality of individually selectable codes; and an actuator circuit and 2) a release device, which can be a mechanical device, which acts to release the data package from the animal. To release a data package from a particular animal, a radio transmitter sends a coded signal which is decoded to determine if the code is valid for that animal data package. Having received a valid code, the release device is activated to release the data package from the animal for subsequent recovery. A second embodiment includes floatation means and is useful for releasing animal data acquisition devices attached to sea animals. This embodiment further provides for releasing a data package underwater by employing an acoustic signal.

5 Claims, 3 Drawing Sheets

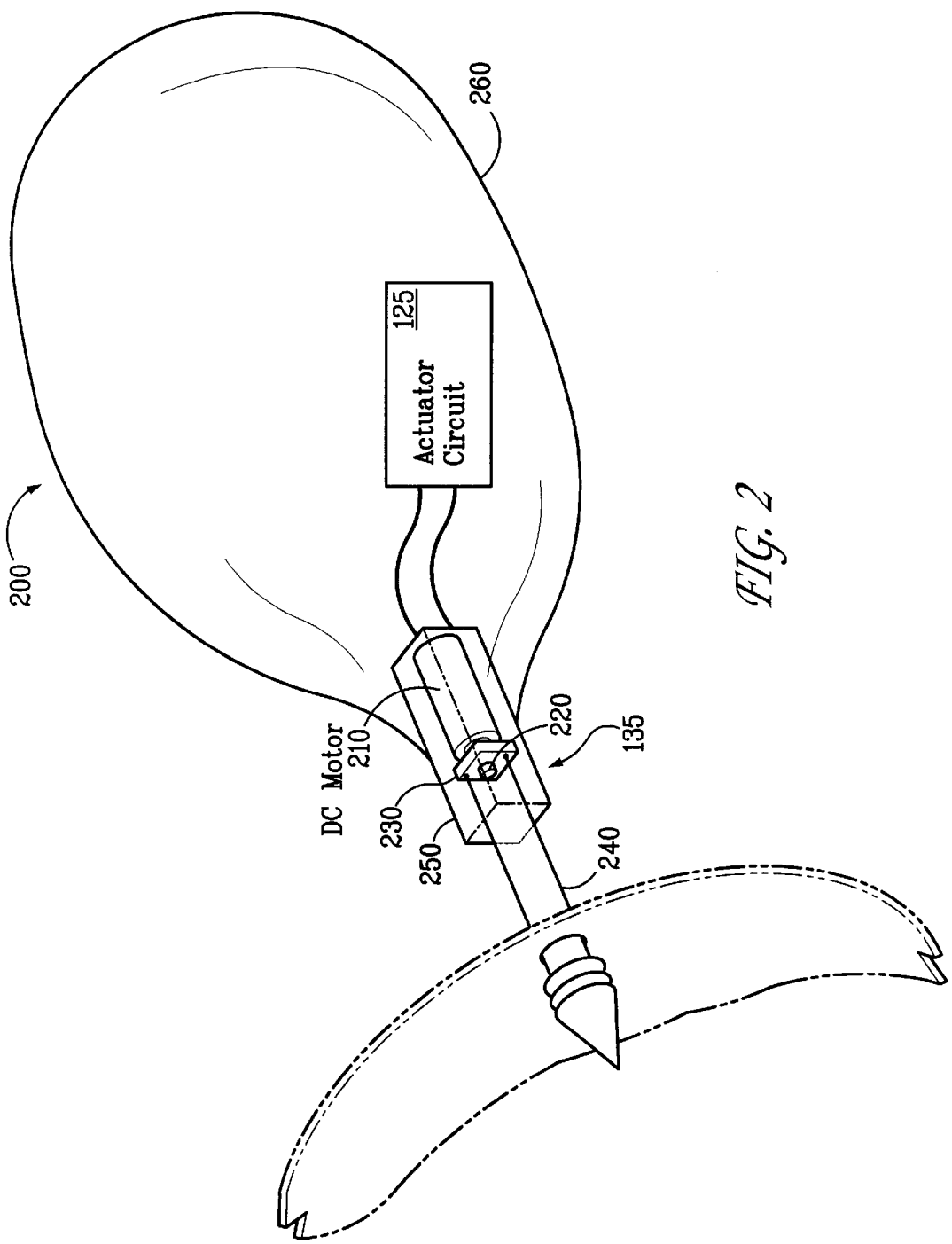

RADIO CONTROLLED RELEASE APPARATUS FOR ANIMAL DATA ACQUISITION DEVICES

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

This invention pertains generally to animal data acquisition systems and particularly to a means for reliable and selective release of animal data acquisition devices.

Animal field studies have become increasingly important as a means for collecting data useful for animal research projects. Data such as physiological condition, migratory habits and range can only be obtained from dedicated field studies of an animal population and/or by tracking the animal population being studied by electronic means such as attaching a data acquisition device to an animal(s). The data acquisition device can include telemetering capability for periodically electronically transmitting data collected by the data acquisition device to a data collection station. It is generally desirable to recover the animal data acquisition device either to recover data stored in the device or, in those instances where data has been previously electronically transmitted, because the data acquisition device itself is expensive. In the case of land animals, recovery of animal data acquisition devices generally requires that the animal wearing the device be physically located and immobilized in some fashion and the data acquisition device removed. Locating and immobilizing the animal can be time consuming and deleterious to the health of the animal. Recognizing this problem, Chapman et al. in U.S. Pat. No. 4,762,088 propose the use of a pyrotechnic release mechanism, actuated by an electrical signal from a remote telemetry actuator such as a radio transmitter, to cause a collar or harness containing a data acquisition device to be released. However, because there is no way to differentiate between various collars, one signal from the radio transmitter can serve to activate simultaneously all the collars which receive the signal. There is presently no way to prevent animal data acquisition devices from being released simultaneously if two animals wearing these collars are in proximity to one another. Further, pyrotechnic devices can be expensive and, in some cases, undesirable for use.

In the case of sea animals, whales, sea lions, seals, etc., a corrodible link can be used to fasten the data acquisition device to the animal. In principle, it is possible by knowing the physical characteristics (i.e., dimensions, composition, etc.) of the corrodible link to calculate the time required for the link to disintegrate, thereby releasing the associated data acquisition device. However, the time required for the link to corrode away is difficult to predict precisely. Consequently, whenever corrodible link technology is used to fasten data acquisition devices to sea animals it is uaually necessary to maintain a recovery crew in the area where the animal is generally located to recover the expensive animal data acquisition device when it is released. This can be a very expensive procedure both in terms of the cost of maintaining a boat and crew at sea as well as lost time. If the animal should leave its normal habitat or weather conditions require the recovery crew to leave the area the data acquisition system can be lost. Thus there is no reliable and accurate way to release a data acquisition device from a sea animal. Moreover, there is presently no way to release animal data acquisition devices from sea animals that are beneath the surface of the water. What is needed is a means for reliably, releasing animal data acquisition devices on command for recovery at a desired time, particularly data acquisition devices useful for sea animals, whether the sea animal is located on the surface or beneath the surface of the water. Further that such means be capable of distinguishing between different data acquisition devices even if the animals wearing the devices are in proximity to one another.

Responsive to these needs, the present invention discloses a novel, inexpensive, miniaturized, programmable remote control apparatus for reliably and selectively releasing an animal data acquisition device. Further, the release device can be either pyrotechnic or a less expensive mechanical device.

SUMMARY OF THE INVENTION

The present invention discloses a novel apparatus for reliably and selectively releasing an animal data acquisition device. The animal data acquisition device and co-located release apparatus together form a set (data package) which can be detachably fastened to an animal by means known in the art. The release apparatus is remotely controlled and includes two major components: 1) an electronics package, comprising a receiver, a decoder comparator, and an actuator circuit; and 2) a release device that can be either a mechanical or pyrotechnic device, preferably an explosive wire cutter, which acts to release the data package from the animal. In one embodiment, when it is desired to release a data package from an animal, a radio transmitter can be used to send a coded digital signal which is received by a radio frequency receiver. The coded digital signal is compared with a code programmed into the decoder comparator to determine the code is valid for that data package. Having received a valid code, the release device is activated to release the data package from the animal for subsequent recovery. Because a radio signal is used to trigger the release mechanism, the data package can be released from the animal at distances up to several miles; the distance being dependent upon the strength of the radio transmitter and the height of the transmitting antenna.

From time to time it may be desirable to release a data package from an animal that is underwater. However, radio frequency signals can penetrate only very shallow depths of water. On the other hand, acoustic signals can travel great distances in water. A second embodiment of the present invention employs an acoustic signal to release the data package. A coded acoustic signal is transmitted, received by a sonic receiver where the coded acoustic signal is compared with a code programmed into the decoder comparator and having received a proper code, a signal is sent to activate a release device, thereby releasing the data package from the animal. Thus, it is not necessary that a recovery team wait until an animal has risen to the surface of the water to recover the animal data acquisition device.

BRIEF DESCRIPTION OF THE DRAWINGS

FIG. 2 shows a second embodiment of the invention.

DETAILED DESCRIPTION OF THE INVENTION

The present invention discloses a novel apparatus for reliably and selectively releasing a data acquisition device from an animal. The apparatus disclosed in the present invention includes two major components: 1) an electronics package, comprising a receiver, a decoder comparator, and an actuator circuit; and 2) a release device that can be either a mechanical or pyrotechnic device, preferably an explosive wire cutter, which acts to release the data package from the animal.

It will be appreciated that because of its small size (typically less than about 2 in$^3$) and low power requirement (the disclosed apparatus can remain operational for about two weeks using 2 AAA batteries) the release apparatus disclosed in the present invention is especially useful for small animals. Further, the disclosed apparatus provides means for releasing an animal data acquisition device both on land as well as in and under the water at any desired time making it particularly desirable for use with sea animals. In addition, the release apparatus disclosed herein responds to digitally coded signals thereby providing for release of only selected data acquisition devices even if multiple data acquisition devices are in proximity to one another. Moreover, since the release device can be either mechanical or pyrotechnic, the present invention provides an inexpensive alternative embodiment to more expensive pyrotechnic release means.

Figure 1:
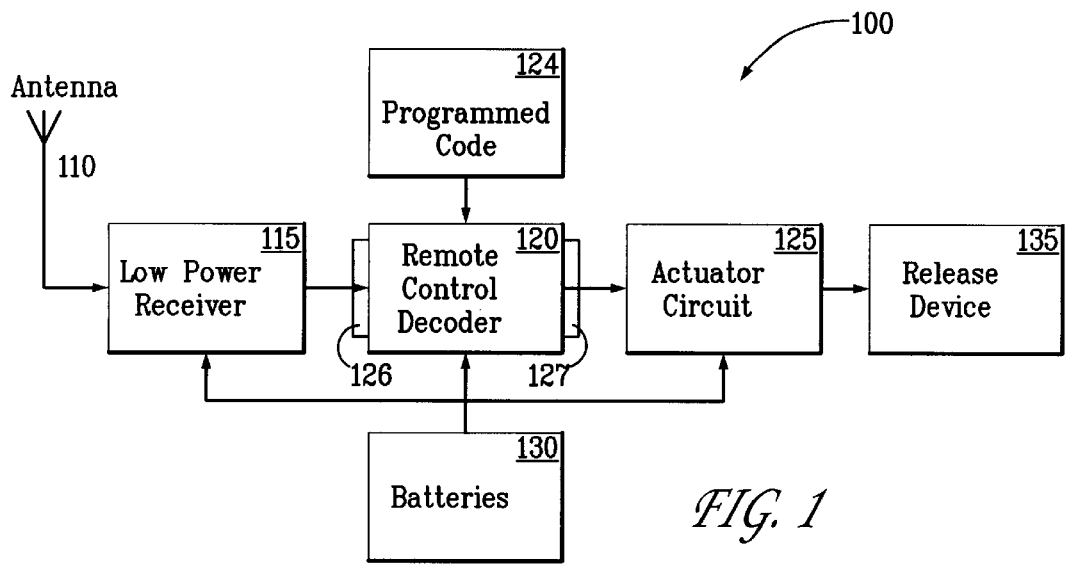
FIG. 1 shows the major elements of one embodiment of the present invention.

One embodiment of the present invention will now be described by reference to FIG. 1. A signal from a radio transmitter (not shown) is sent to the release apparatus 100 and is received by antenna 110. The signal received by antenna 110 is transmitted to receiver 115, preferably an integrated circuit such as Philips UAA2080T, or its equivalent, having the characteristics of high sensitivity (typically −120 dBm), small size (less than about 2 in$^3$) and low power drain (less than 3 mA at 3 V). The signal from receiver 115 is converted to a digital signal and sent to remote control decoder 120, such as a Holtek HT691 IC, where the digital signal is compared to a code, preferably a trinary number code 124 programmed into address pins 126. If no error is encountered, i.e., the digital code sent by the radio transmitter (not shown) is identical to that programmed into the remote control decoder 120, the input digital signal is transferred to output pins 127 and then to actuator circuit 125. Actuator circuit 125 can include an arrangement of transistors which act as a solid state latching relay, whereby voltage from power supply 130 is applied to release device 135. If the release device is a pyrotechnic, the voltage from power supply 130 will cause the pyrotechnic to detonate, cutting the attachment between a data package, comprising the release apparatus 100 and the data acquisition device itself (not shown), and the animal. It is preferred that the pyrotechnic device be a low power device, such as a Holex 2800 series pyrotechnic guillotine cutter, such that a firing current supplied by batteries is sufficient to provide activation. Release device 135 can, alternatively, be a mechanical device, thereby reducing the cost of the release apparatus and/or lessening the shock to an animal that may be caused by a pyrotechnic release device. By way of example, release device 135, may be comprised of a micromotor 210, a screw 220 and a nut 230 contained within a housing 250, and attached to animal through a connector 240, such as generally depicted in FIG. 2, can be employed to release the data package 200. Here, actuator circuit 125 drives micromotor 210 causing screw 220, fixedly attached to micromotor 210, to disengage from nut 230, fixedly attached to connector 240. Together connector 240 and nut 230 are contained in housing 250 that prevents nut 230 from rotating when micromotor 210 turns screw 220, thereby disengaging the data package 200 from an animal. The data package 200 can be attached to an animal through connector 240 by a dart or harpoon or other means known in the art. Power supply 130, provides power to receiver 115 and decoder 120 as well as actuator 125.

Figure 3:
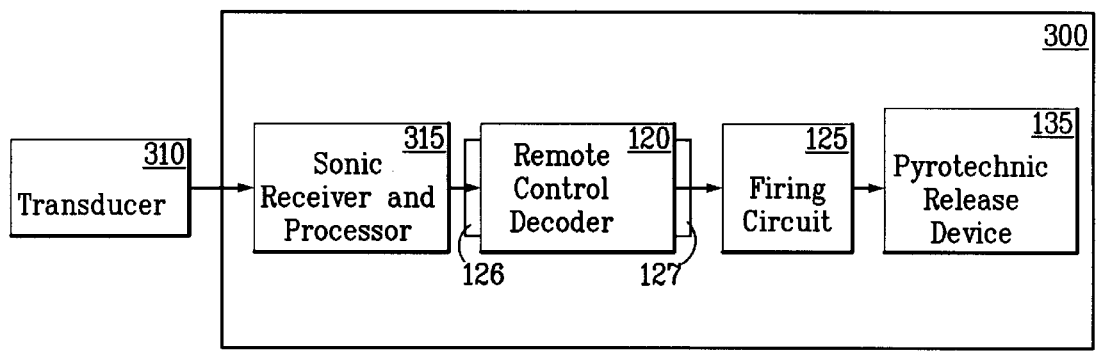
FIG. 3 shows an embodiment of a mechanical release device.

A second embodiment is of the release apparatus of the present invention is set forth in FIG. 3. Here the release apparatus is configured to permit a data package to be released while the data package is underwater. In contrast to radio frequency waves which can penetrate only very shallow depths of water (a few inches), acoustic energy can travel great distances through water (many thousands of miles, depending on the strength of the signal and propagation conditions such as signal frequency, water temperature, etc.). Consequently, whenever it is desired to release an animal data acquisition device while it is still underwater a second embodiment of the present invention employs a coded acoustic signal. An acoustic signal from a transducer 310 is sent to release apparatus 300 where it is received by sonic receiver 315 and converted into a digital signal. The digital signal is sent to remote control decoder 120 where the signal is processed exactly as set forth above.

In contrast to release on land, release of the data package at sea requires that the package be provided with floatation means. A preferred floatation means is to encapsulate the data package in a low viscosity epoxy syntactic foam 260, wherein the foam 260 can contain glass microballoons to aid in floatation.

Figure 4:
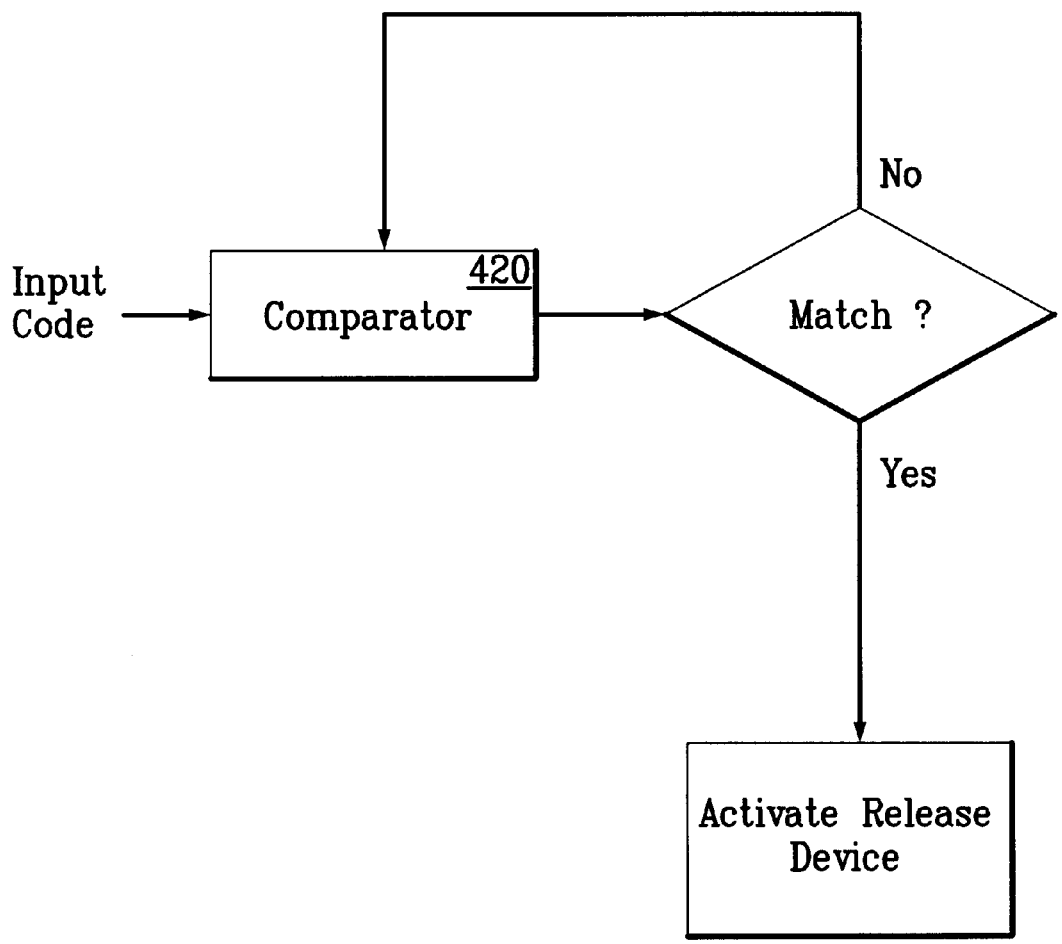
FIG. 4 illustrates the information flow in the present invention.

The flow of information received by the data package release device is shown in FIG. 4. Input code that has been converted to a coded digital signal by decoder 120 is sent to comparator 420 where the coded digital signal from decoder 120 is compared to preprogrammed code resident in comparator 420. If there is no match the signal continually loops through comparator 420. If there is a match a signal is sent by actuator 125 to activate release device 135.

From the foregoing description and example, one skilled in the art can readily ascertain the essential characteristics of the present invention. The description and example is intended to be illustrative of the present invention and are not to be construed as limitations or restrictions thereon, the invention being delineated in the following claims.

I claim:

1. An apparatus for remotely releasing a data package from an animal, comprising:
   a) an electronics package, comprising;
      i) receiving means for receiving a transmitted coded release signal;
      ii) means for comparing the transmitted coded release signal to a unique code associated with the said animal data package; and
      iii) an actuator circuit for generating an activating signal, and
   b) a release device adapted to receive the activating signal, said release device having means responsive thereto for releasing said animal data package, wherein said release device is a mechanical device further comprising:
      i) a micromotor;
      ii) a screw fixedly attached to a rotor of the micromotor;
      iii) a nut adapted to fit the screw, wherein the nut is fixedly attached to a connector, said connector providing a link to a means for attaching said data package to an animal; and iv) a housing containing said connector and said nut and which acts to prevent said nut from turning when the screw is caused to rotate.

2. The apparatus of claim 1, further including floatation means comprising a low viscosity epoxy synthetic foam.

3. The apparatus of claim 1, wherein the receiving means comprises a radio receiver.

4. The apparatus of claim 1, wherein the receiving means comprises a sonic receiver.

5. The apparatus of claim 2, wherein the low viscosity epoxy synthetic foam further includes glass microballoons.

\* \* \* \* \*